(12) United States Patent
Morse

(10) Patent No.: US 6,283,525 B1
(45) Date of Patent: Sep. 4, 2001

(54) BED EXTENDER APPARATUS FOR A PICKUP TRUCK

(76) Inventor: Charles H. Morse, 25 Crescent St., Beverly, MA (US) 01915

(*) Notice: Subject to any disclaimer, the term of this patent is extended or adjusted under 35 U.S.C. 154(b) by 0 days.

(21) Appl. No.: 09/695,482

(22) Filed: Oct. 24, 2000

(51) Int. Cl.[7] .............................. B62C 1/06; B62D 33/08; B60R 21/02
(52) U.S. Cl. .................................... 296/26.02; 296/26.06; 296/26.11; 280/748
(58) Field of Search .............................. 296/26.02, 26.08, 296/26.11, 26.03, 56, 57.1, 37.6, 43, 26.06; 280/748

(56) References Cited

U.S. PATENT DOCUMENTS

| | | | | |
|---|---|---|---|---|
| 4,310,194 | * | 1/1982 | Biller | 296/159 |
| 4,695,087 | * | 9/1987 | Hollrock | 296/14 |
| 5,700,047 | * | 12/1997 | Leitner et al. | 296/26 |
| 5,732,995 | * | 3/1998 | Piccariello | 296/57.1 |
| 5,816,638 | * | 10/1998 | Pool, III | 296/26.11 |
| 5,971,459 | * | 10/1999 | Gauthier | 296/26.1 |
| 6,113,173 | * | 9/2000 | Leitner et al. | 296/26.11 |
| 6,120,076 | * | 9/2000 | Adsit et al. | 296/26.11 |

\* cited by examiner

Primary Examiner—Joseph D. Pape
Assistant Examiner—Greg Blankenship
(74) Attorney, Agent, or Firm—Don Halgren

(57) ABSTRACT

The present invention relates to a bed extender apparatus for extending and enlarging the useful carrying capacity of the bed of a pickup truck. The pickup truck has an elongated bed defined by a forward wall, a pair of sidewalls, a floor and a tailgate hingedly attached to a rearward edge of the floor. The bed extender apparatus comprises a U-shaped frame movably arranged on an upper edge of the sidewalls, the U-shaped frame including a transverse wall and a pair of parallel arms. The transverse wall is storably disposed adjacent the forward wall of the bed when the bed extender apparatus is in a non-bed extended configuration. The transverse wall is displaceable onto the tailgate when the bed extender is in a bed extended configuration.

19 Claims, 11 Drawing Sheets

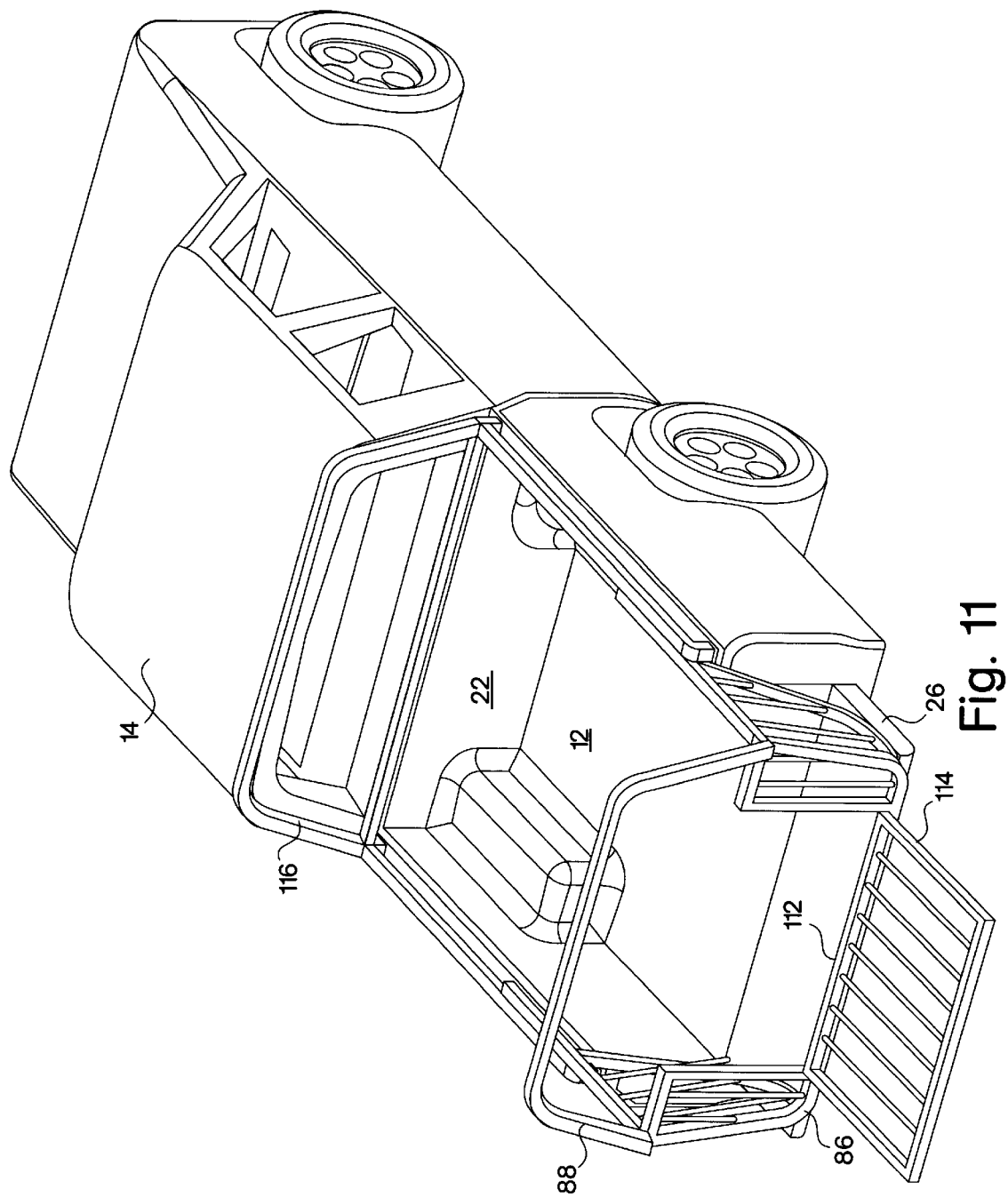

US 6,283,525 B1

BED EXTENDER APPARATUS FOR A PICKUP TRUCK

BACKGROUND OF THE INVENTION

1. Field of the Invention

This invention relates to apparatus for increasing the load carrying capacity of pickup trucks, and more particularly to articulable frame arrangements for extending the bed of a pickup truck.

2. Prior Art

Pickup trucks are well known and very common in the United States. They are popular vehicles for all walks of American life. Often they may see duty as a family vehicle as well as a cargo carrying truck for its utility purposes.

A number of approaches have been attempted to extend the cargo carrying capacity of the bed of a pickup truck to at least the area over the tailgate when the tailgate is in its down (horizontal) position. Such an attempt is shown in U.S. Pat. No. 6,113,173 to Leitner et al., which shows a wall which is movable over a tailgate of a truck from an inside position on the bed to the over the tailgate position. As is typical with many of these arrangements, these devices take up as much room in the bed, as they add to the truck bed when in their extended orientation. Furthermore, many of these arrangements are unduly complicated and when they do work, merely extend the volume of the truck without adding other capabilities.

It is an object of the present invention to overcome the disadvantages of the prior art.

It is a further object of the present invention, to provide a pickup truck bed extender apparatus which also features the ability to carry a further diverse payload than that shown by the prior art arrangements.

It is another object of the present invention to provide a bed extender which protects the rear window of the cab of the pickup truck in the stowed orientation.

It is still yet a further object of the present invention, to provide a truck bed extender that is simple to operate, which extender takes up minimum space, and is unobtrusive within the normal cargo bed of a pickup truck.

BRIEF SUMMARY OF THE INVENTION

The present invention comprises a cargo bed extender arrangement for use in a bed of a pickup truck. A pickup truck is typically a truck having a wheel base of an automobile and has a "cab" where the driver sits, behind which cab there is located a cargo carrying bed defined by a pair of parallel sidewalls, and a forward wall immediately adjacent and parallel to the back wall of the cab. A tailgate is hingedly supported from the rearwardmost end of the bed and adjacent the back end of the sidewalls.

The bed extender apparatus of the present invention comprises a generally U-shaped frame having a first or transverse wall arranged immediately adjacent and parallel to the back wall of the cab of the pickup truck. The transverse wall has a first edge defining its perimeter.

A first arm and a second arm are arranged parallel to the first and second sidewalls of the pickup truck, each first and second arm being attached to an end of the transverse wall. The first and second arm each have a second end which is attached to a securement joint along an upper edge of the first and second sidewalls. The first arm and the second arm along with the transverse wall, jointly form the generally U-shaped configuration of the bed extender apparatus.

A generally U-shaped support frame is attached adjacent the first end of each first and second arm. The support frame is arranged to extend within the bed of the pickup truck when the bed extender apparatus is in its nesting or stored-away configuration.

In a further embodiment of the present invention, an intermediate wall portion may be arranged between the first end of each first and second arms and the edges of the transverse wall, to provide an enclosure configuration to the bed extender apparatus.

To adapt the bed of the pickup truck into an extended bed configuration, the tailgate is rotated about its hinge, into a horizontal orientation. The bed extender apparatus may then be pivoted or re-arranged about its respective securement joints on the upper side of each first and second sidewall of the pickup truck bed. The first edge of the transverse wall is thus juxtaposed into the lower edge of the transverse wall which rides upon the distalmost edge of the now horizontal tailgate. The first and second arms are secured to the securement joints, thus securing the apparatus in the opened configuration, to the pickup truck. The support frame originally nested within the forward edge of the pickup truck bed now becomes an "upper" support frame when the bed extender apparatus rests upon the tailgate. The support frame functions as a rearward support for elongated cargo which may rest thereacross as well as atop a forward frame component adjacent the rearward wall of the cab of the pickup truck.

In a further preferred embodiment of the present invention, an upright support frame may be removably arranged from a position adjacent the first ends of the first and second arms of a configuration in which it is immediately adjacent the transverse wall of the bed extender apparatus. The support frame in this embodiment, is thus removable from a pair of spaced apart openings adjacent the transverse wall, and is replaceable into a second set of spaced apart openings on the opposite sides of the transverse wall to provide a rear upper frame portion onto which equipment and material may be supported in conjunction within existing support frame at the forward edge of the truck bed.

In a further embodiment of the present invention, the U-shaped bed extender apparatus has a transverse wall as in the aforementioned embodiments, with a U-shaped frame support hingedly attached to the respective ends of the transverse wall. The U-shaped frame support is in parallel alignment and is immediately adjacent the transverse wall when the bed extender apparatus and transverse wall is oriented in its forwardmost or "stowed-away" configuration. When the U-shaped bed extender apparatus is moved into its bed extending configuration, for example, as by pivoting about securement joints at the ends of the side arms, or by moving the bed extender apparatus 180 degrees, the U-shaped frame support is flipped about a pair of hinges into an upright or vertically opposed relationship with respect to the transverse wall, now resting upon the horizontally disposed tailgate. The transverse wall may also have a mid-portion which folds down about a hinge to create a "ramp" onto the tailgate. The frame support provides a rear support means to elongated cargo which supported forwardly either on the roof of the cab or onto a forward support frame fixedly attached to the wall on the front end of the cargo bed of the pickup truck.

Thus, what has been shown is a unique bed frame apparatus which may be moved or pivoted from a first stowaway orientation immediately adjacent the rear wall of a cab of a pickup truck, into a bed extender orientation atop the folded down tailgate of that pickup truck. The bed extender apparatus of this invention also provides a further frame for supporting equipment and material in general alignment with the roof of the cab thus further increasing the load carrying capacity of the pickup truck while maintaining its minimum interference with any carrying capacity of the truck bed when such bed extender apparatus is not in use.

The invention thus comprises a bed extender apparatus for extending and enlarging the useful carrying capacity of the bed of a pickup truck. The pickup truck has an elongated bed defined by a forward wall, a pair of sidewalls, a floor and a tailgate hingedly attached to a rearward edge of the floor. The bed extender apparatus comprises a U-shaped frame movably arranged on an upper edge of the sidewalls, the U-shaped frame including a transverse wall and a pair of parallel arms, the transverse wall being storably disposed adjacent the forward wall of the bed when the bed extender apparatus is in a stowed or non-bed extended configuration, the transverse wall being displaceable onto the tailgate when the bed extender is in a bed extended configuration. The arms have a second end which are attached to the sidewalls of the pickup truck. The second end of the arms are pivotably connected to the sidewalls by an articulable joint. The transverse wall includes a generally U-shaped support frame arranged opposed thereto to function as a rearward support for cargo to be carried in an overhead manner. A side partition is arranged at a first end of each of the arms and adjacent the transverse wall to provide an enclosure arrangement to any cargo carried in the bed of the pickup truck. The transverse wall may include a generally U-shaped support frame removably arranged in a first end of the arms, to be re-installed in the arms at an opposite side thereof when the bed extender apparatus is in a bed extending configuration above the tailgate.

The invention also includes a method of extending the bed of a pickup truck, the bed being comprised of a floor, a forward wall, a pair of sidewalls and a tailgate hingedly arranged at a rearward edge of the floor, the method comprising the steps of: arranging a generally U-shaped frame having a pair of generally parallel side arms and a transverse wall on an upper edge on the forward wall of the bed; displacing the U-shaped frame 180 degrees from its position on the forward wall to a position wherein the transverse wall is disposed on said tailgate when said tailgate is in a lowered orientation; arranging a support frame adjacent the transverse wall, displaceable with respect to the forward wall of the bed, to provide an overhead support to elongated cargo when the U-shaped frame is displaced from a forwardmost storage position to a rearwardly extending bed-extended orientation; removing the support frame from a pair of openings in the arms; and inserting the support frame into a second pair of openings in the arm when the transverse wall is arranged into a bed extended orientation on the tailgate.

BRIEF DESCRIPTION OF THE DRAWINGS

The objects and advantages of the present invention will become apparent, when viewed in conjunction with the following drawings in which:

FIG. 11 is the bed extender shown in FIG. 10 with a gate or ramp-like door folded down from the transverse wall.

DESCRIPTION OF THE PREFERRED EMBODIMENTS

Figure 1:
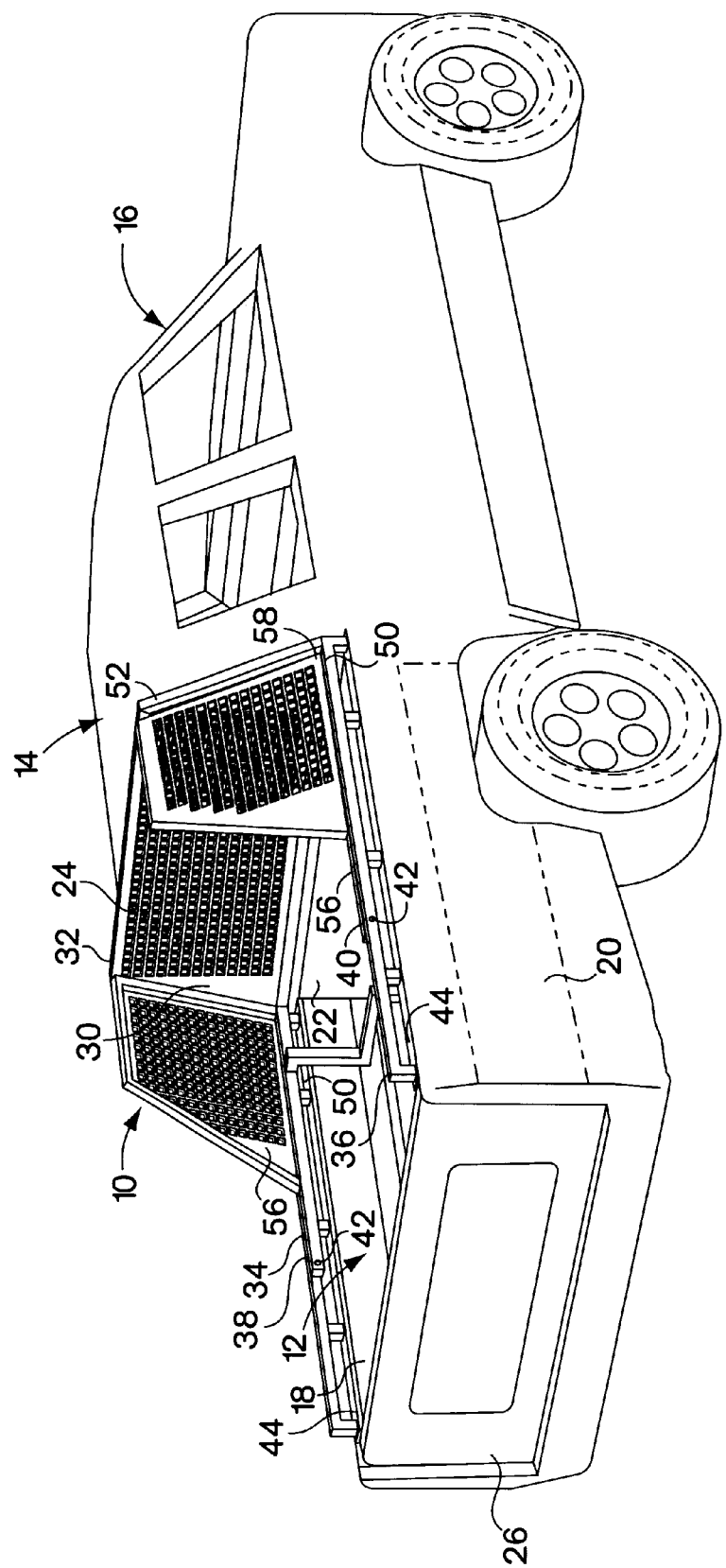
FIG. 1 is a perspective view of a bed extender apparatus in its stowed configuration.

Referring now to the drawings in detail, and particularly to FIG. 1, there is shown the present invention which comprises a cargo bed extender apparatus 10 for use in a bed 12 of a pickup truck 14. A pickup truck 14 is typically a truck having a wheel base of an automobile and has a "cab" 16 where the driver sits, behind which cab there is located a cargo carrying bed 12 defined by a pair of parallel sidewalls 18 and 20, and a forward wall 22 immediately adjacent and parallel to the back wall (or window) 24 of the cab 16. A tailgate 26 is hingedly supported from the rearwardmost end of the bed 12 and adjacent the back end of the sidewalls 18 and 20.

The bed extender apparatus 10 of the present invention comprises a generally U-shaped frame having a first or transverse wall 30 arranged immediately adjacent and parallel to the back wall 24 of the cab 16 of the pickup truck 14. The transverse wall 30 may be made of, for example, spaced apart bars or a grate material, and has a first edge 32 defining a portion of its perimeter.

A first arm 34 and a second arm 36 are arranged parallel to the first and second sidewalls 18 and 20 of the pickup truck 14, as may be seen in FIG. 1. Each first and second arm 34 and 36 is attached to an end respectively, of the transverse wall 30. The first and second arm 34 and 36 each have a respective second end 38 and 40 which is attached to a securement joint 42 along an upper edge 44 of the first and second sidewalls 18 and 20. The first arm 34 and the second arm 36 along with the transverse wall 30, jointly form the generally U-shaped configuration of the bed extender apparatus 10.

A generally U-shaped support frame 48 may be attached adjacent the first end 50 of each first and second arm 34 and 36. The support frame 48 is arranged to be snuggly disposed within the bed 12 of the pickup truck 14 when the bed extender apparatus 10 is in its nesting or stored-away configuration.

In a further embodiment of the present invention, an intermediate, generally U-shaped frame portion 52, may be arranged between the first end 50 of each first and second arms 34 and 36, and the edge 32 of the transverse wall 30, to provide an "enclosure configuration" to the bed extender apparatus 10. A pair of side partitions 56 and 58 may be arranged between the juncture of the side arms 34 and 36 and the transverse wall 30 to add to the containment of cargo with the bed 12 as well as within extended bed as represented in FIG. 3.

Figure 3:
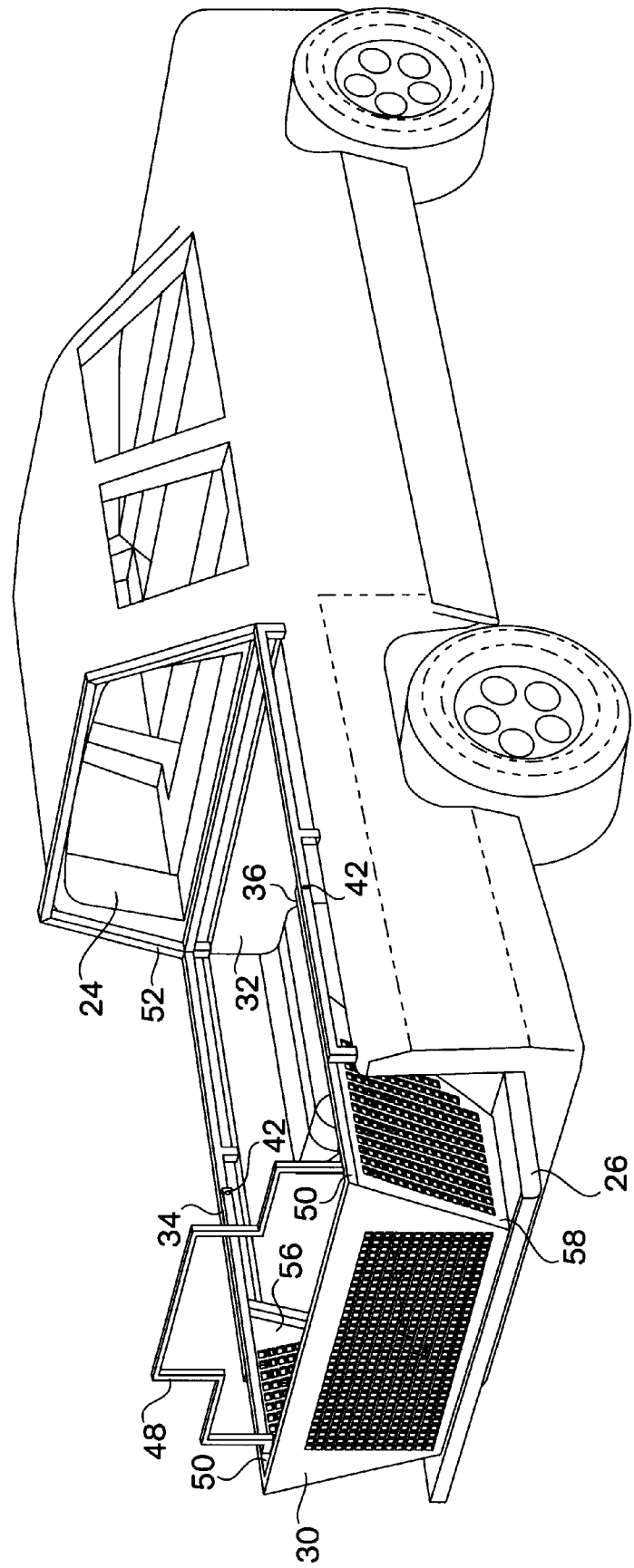
FIG. 3 is a view similar to FIG. 2, showing the bed extender apparatus arranged over the tailgate of a pickup truck.
Figure 4:
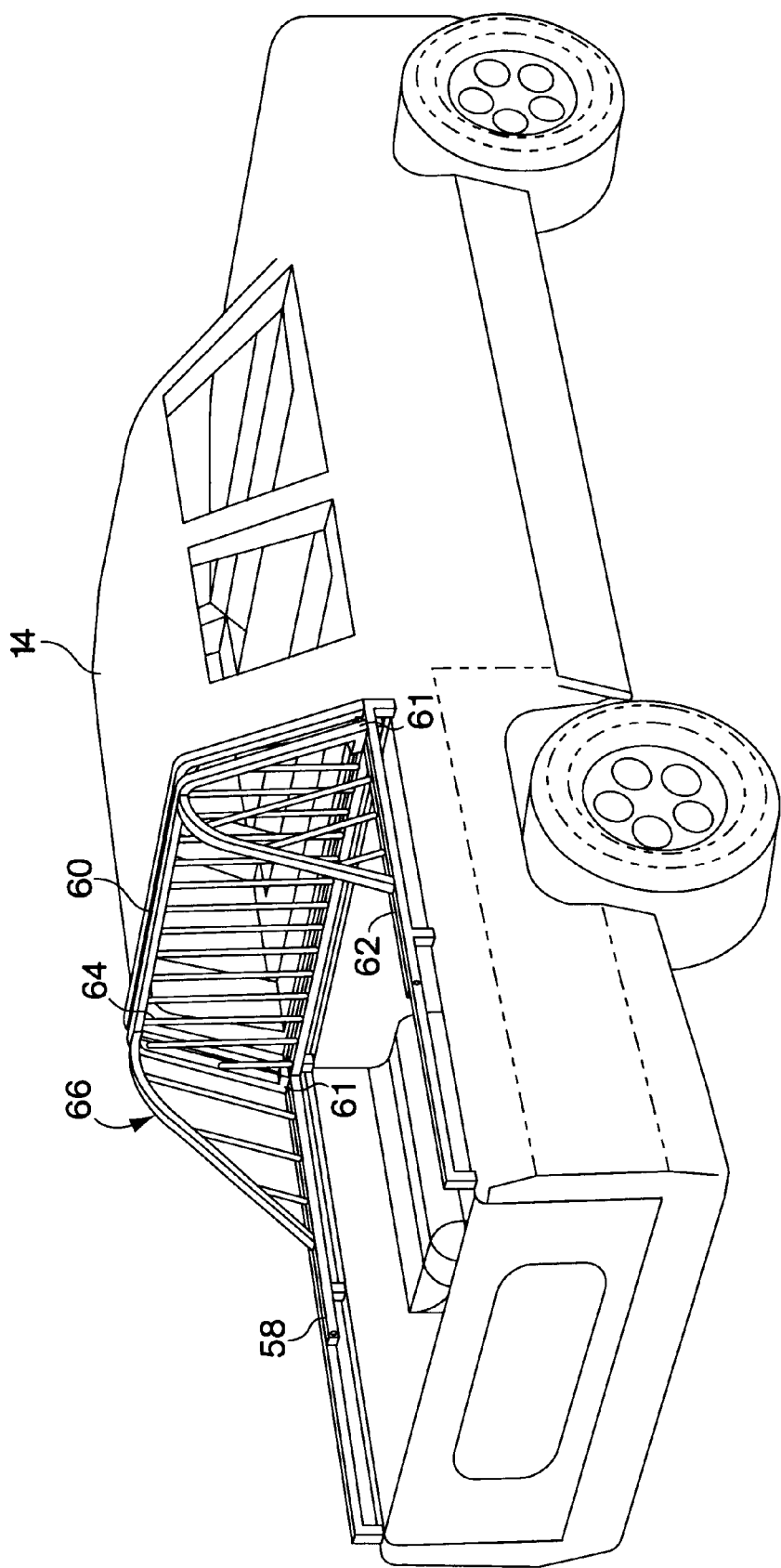
FIG. 4 is a view similar to FIG. 1, showing a further embodiment of the bed extender apparatus.
Figure 5:
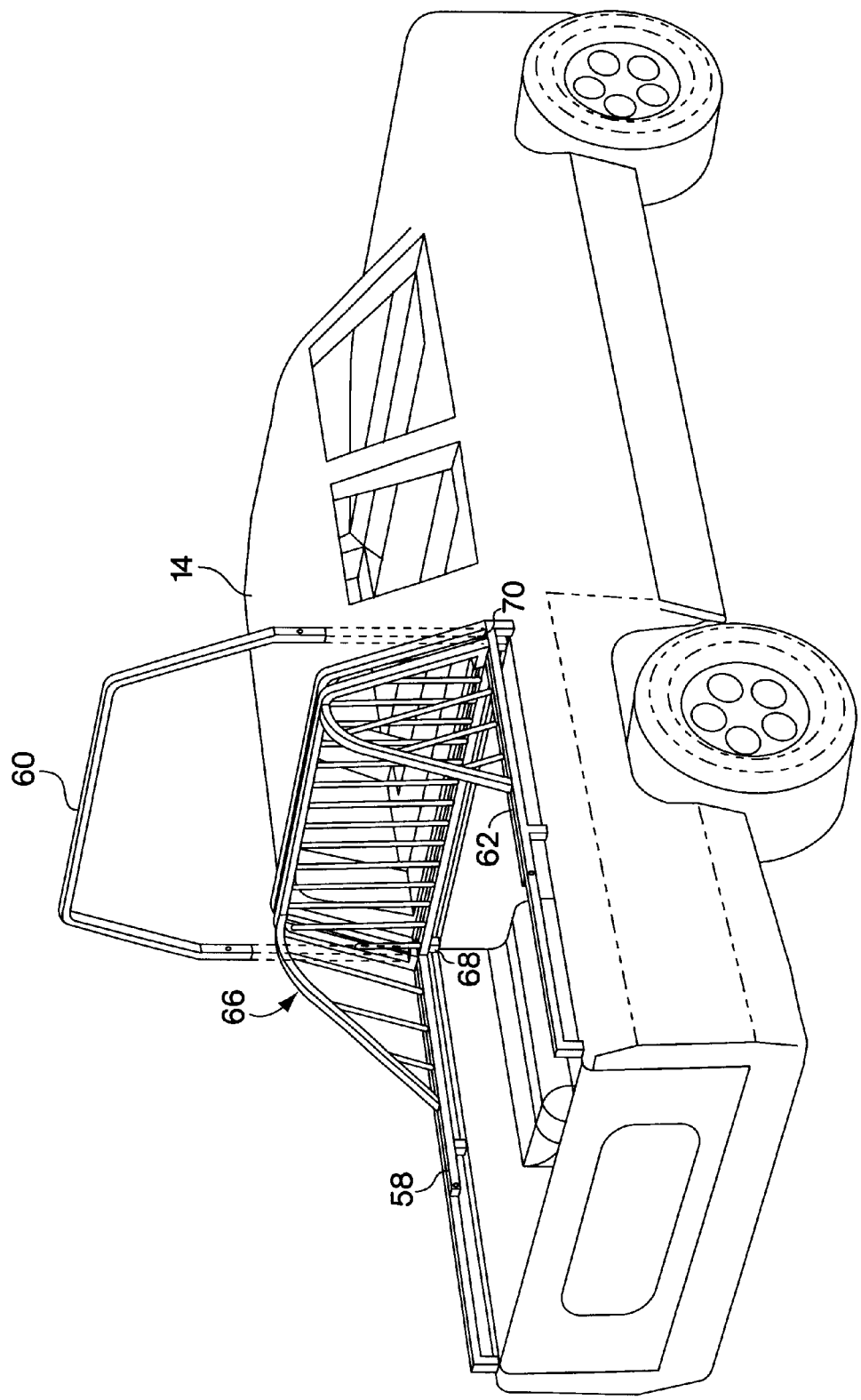
FIG. 5 is a view similar to FIG. 4, showing a portion of the frame extender apparatus in an exploded configuration.

To adapt the bed of the pickup truck into an extended bed configuration as may be seen in FIG. 3, the tailgate 26 is rotated about its hinge, into a horizontal orientation. The bed extender apparatus 10 may then be pivoted or re-arranged about its respective securement joints 40 and 42 on the upper side 44 of each first and second sidewall 18 and 20 of the bed 12 of the pickup truck 14. The first edge 32 of the transverse wall 30 is thus juxtaposed into the lower edge of the transverse wall 30 which rides upon the distalmost edge of the now horizontal tailgate 26 as is represented in FIG. 3. The first and second arms 34 and 36 are secured to the truck 14 through the securement joints 42, thus securing the apparatus 10 in the opened configuration, to the pickup truck 14. The support frame 48 originally nested within the forward space of the pickup truck bed 12 now becomes an "upper" support frame 48 when the bed extender apparatus 10 rests upon the tailgate 26. The support frame 48 functions as a rearward support for elongated cargo (wood, pipes etc.) which may rest thereacross as well as atop the forward frame component 52 adjacent the rearward wall 24 of the cab 16 of the pickup truck 14.

Figure 2:
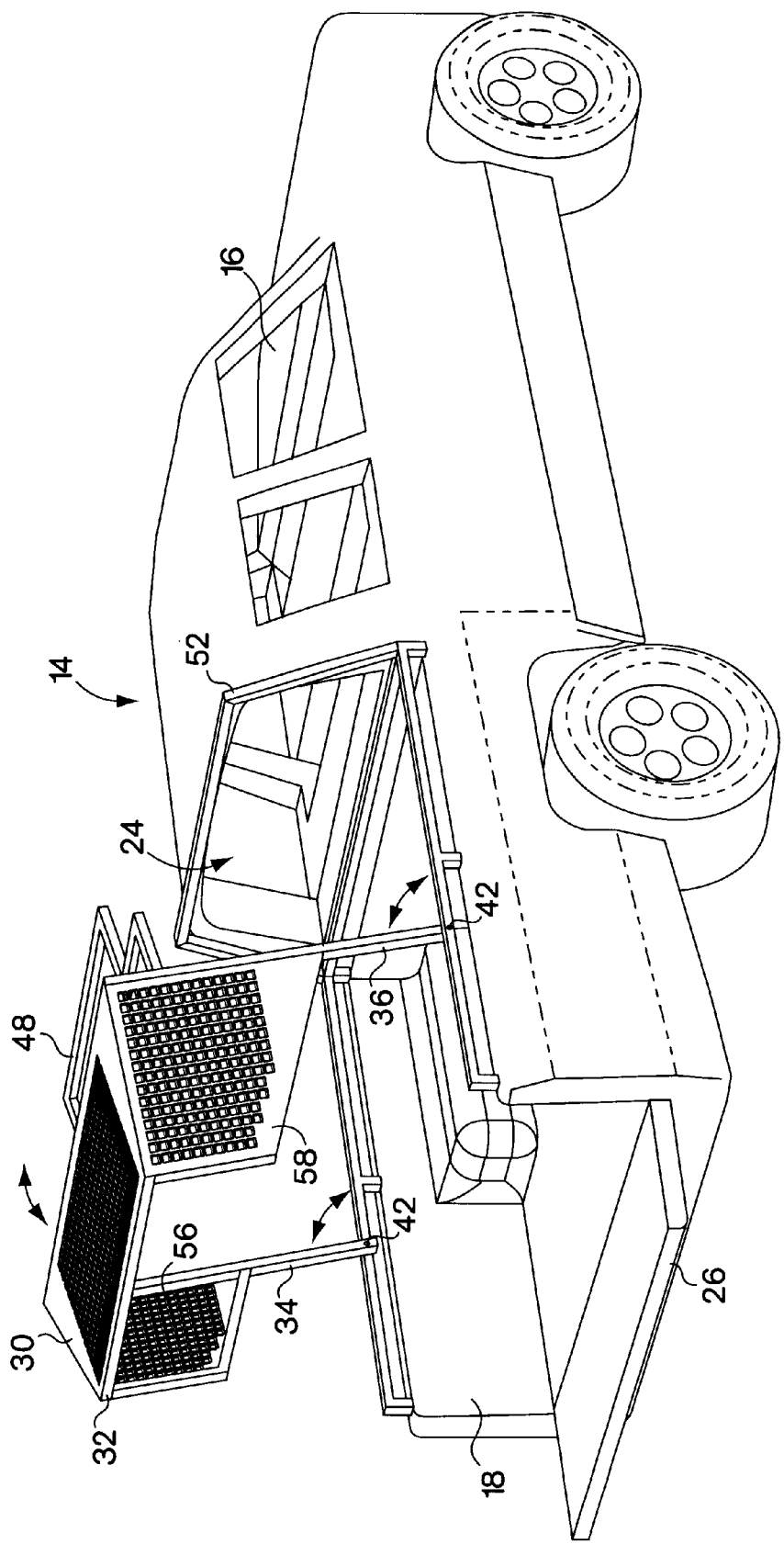
FIG. 2 is a view similar to FIG. 1 showing the bed extender apparatus being shifted from its stowed configuration toward a bed extended configuration.
Figure 6:
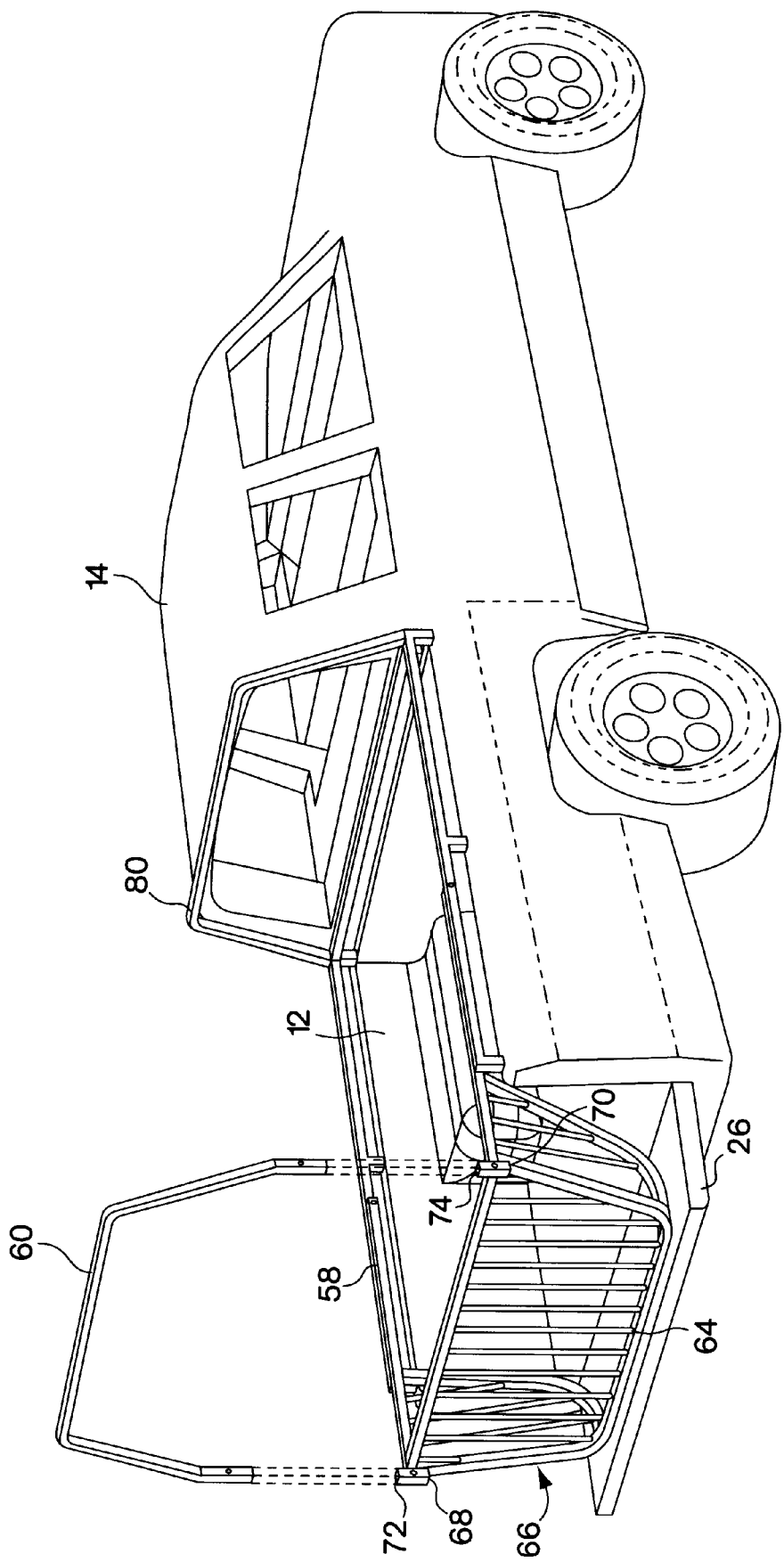
FIG. 6 is a view of the further embodiment of the bed extender apparatus in its over the tailgate configuration in with the frame extender in an exploded view.
Figure 7:
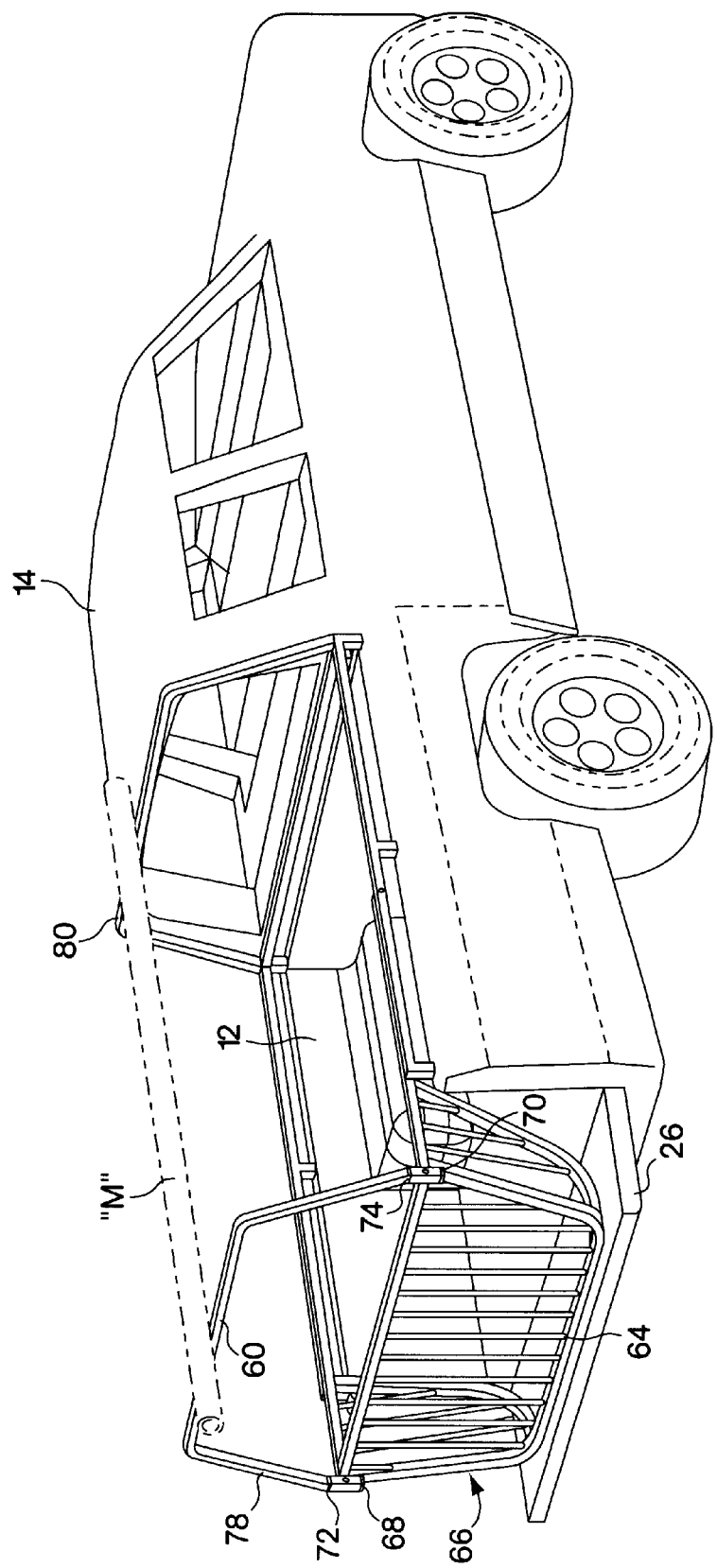
FIG. 7 is a view similar to FIG. 3 showing the bed extender apparatus in its fully setup configuration.
Figure 8:
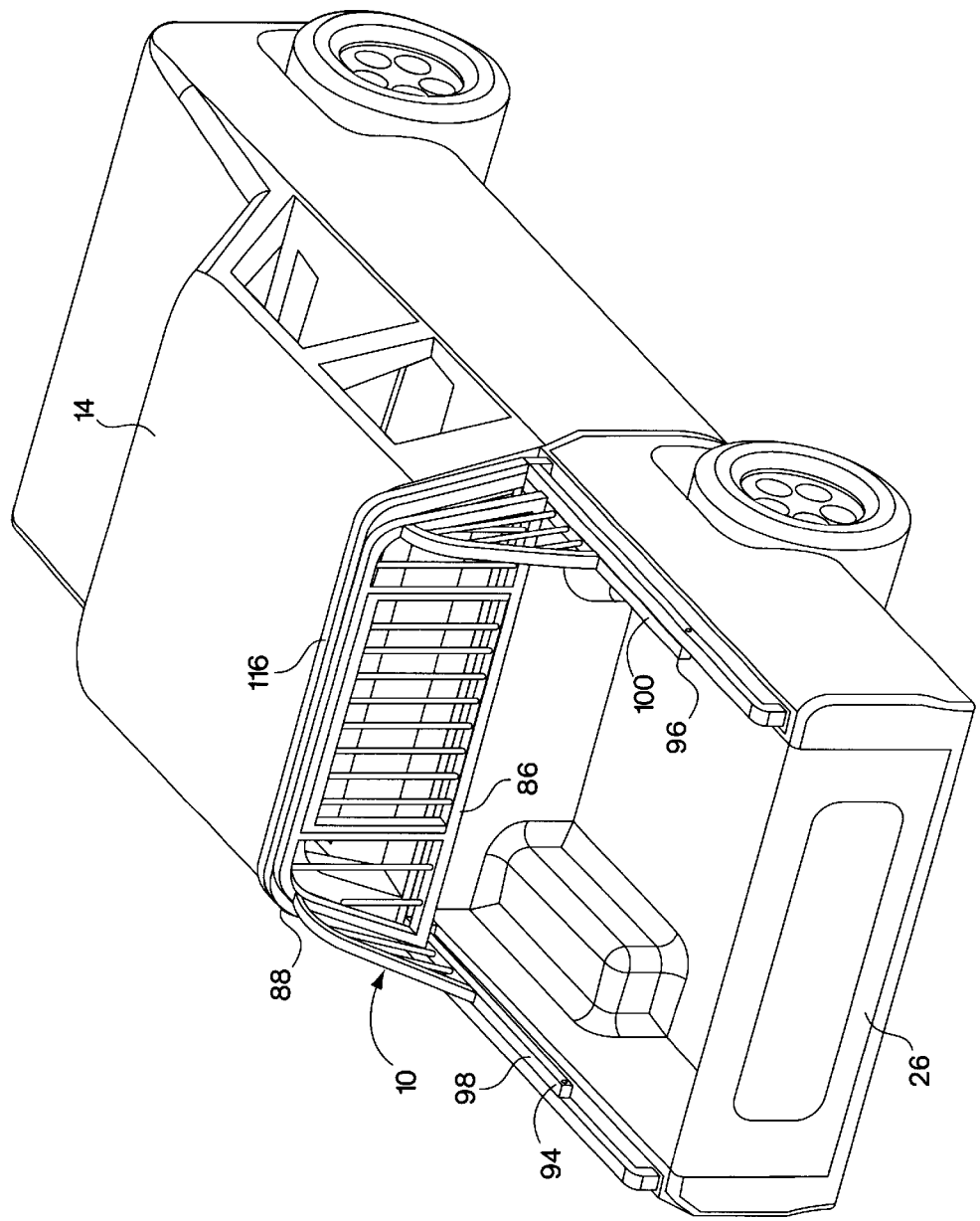
FIG. 8 is yet another embodiment of the bed extender apparatus shown in a perspective view.
Figure 9:
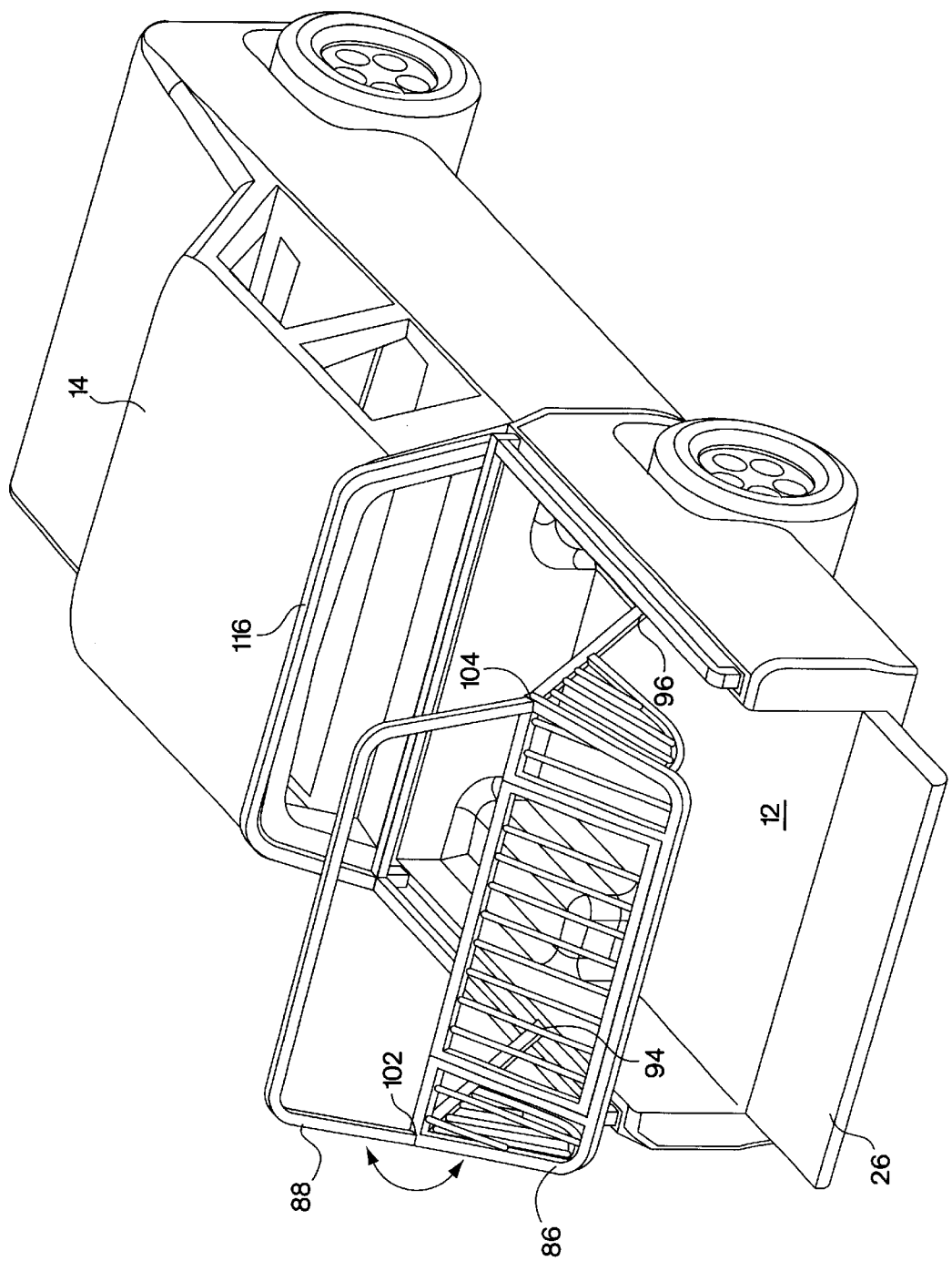
FIG. 9 is a view of the bed extender apparatus shown in FIG. 8, with the bed extender apparatus being flipped rearwardly, and its frame support flipped upwardly.
Figure 10:
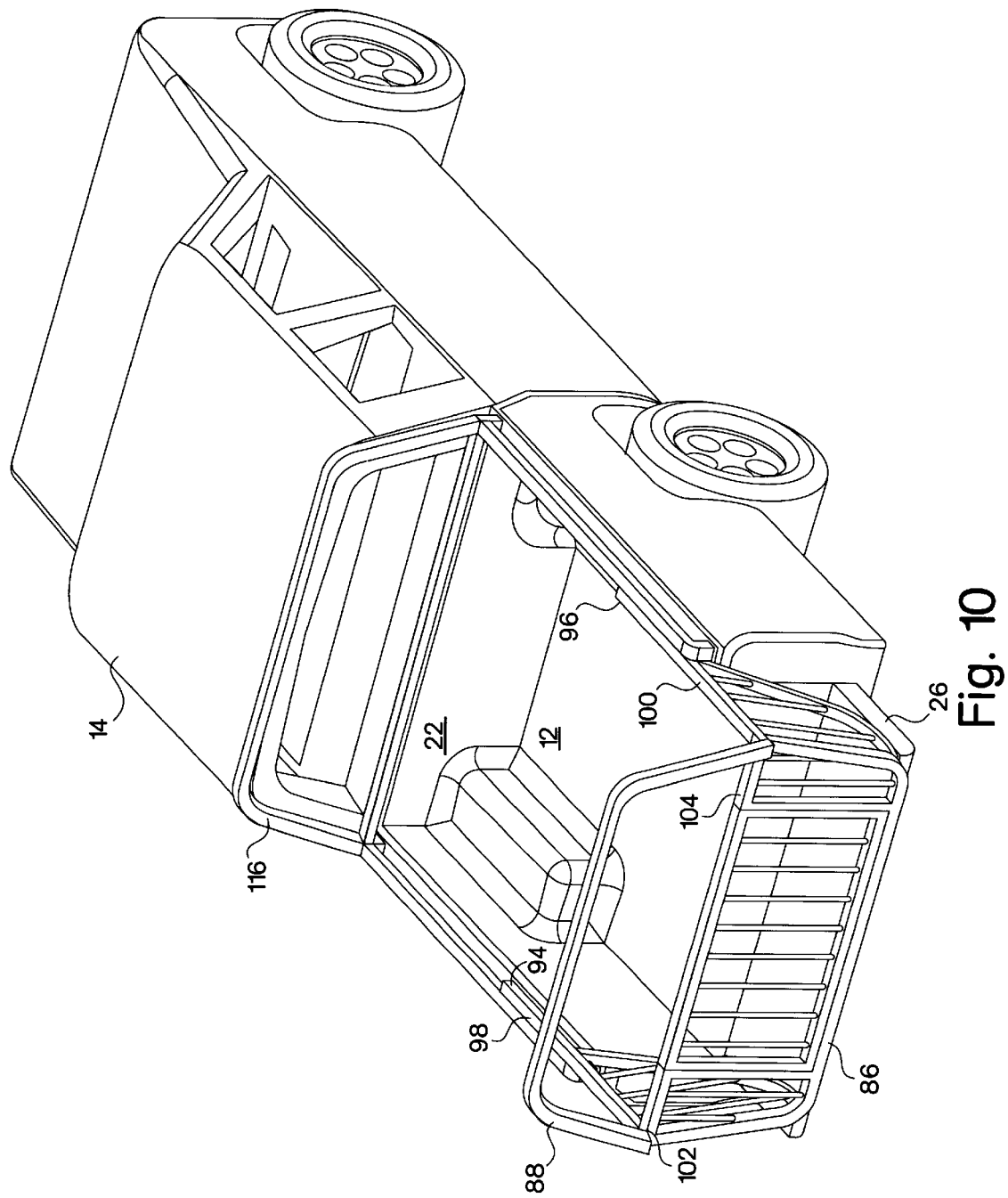
FIG. 10 is a view of this bed extender apparatus in its bed extended orientation.

In a further preferred embodiment of the present invention, as shown in FIGS. 4, 5, 6 and 7, an upright support frame 60 may be removably arranged from a position adjacent the first ends 61 of the first and second arms 58 and 62, corresponding to the embodiment shown in FIGS. 1–3. The frame 60 is removeably stored in a configuration in which it is immediately adjacent the transverse wall 64 of the bed extender apparatus 66. The support frame 60 in this embodiment, is thus removable from a pair of spaced apart openings 68 and 70 adjacent the transverse wall, and is replaceable into a second set of spaced apart openings 72 and 74 at the corner and on the opposite sides of the transverse wall 66, as shown in FIGS. 6 and 7, to provide a rear upper frame portion 78, as shown in FIG. 7, onto which elongated equipment and material "M" (shown in phantom) may be supported in conjunction within an existing support frame 80 at the forward edge of the bed 12 of the pickup truck 14.

In a further embodiment of the present invention as shown in FIGS. 8 through 11, the U-shaped bed extender apparatus 10 has a transverse wall 86 as in the aforementioned embodiments, with a U-shaped frame support hingedly 88 attached to the respective ends 90 and 92 of the transverse wall 86. The U-shaped frame support 88 is in parallel alignment and is immediately adjacent the transverse wall 86 when the bed extender apparatus 10 and transverse wall 86 is oriented in its forwardmost or "stowed-away" configuration, as may be seen in FIG. 8. When the U-shaped bed extender apparatus 10 is moved "towards" its bed extending configuration, as may be seen in FIG. 9, the movement being for example, a pivoting about securement joints 94 and 96 at the ends of the side arms 98 and 100, or by moving the bed extender apparatus 10 around, by 180 degrees, and the U-shaped frame support 88 is flipped about a pair of hinges 102 and 104 into an upright or vertically opposed and locked relationship with respect to the transverse wall 86, now shown resting upon the horizontally disposed tailgate 26, as may be seen in FIG. 10. The transverse wall 86 may also have a mid-portion 110 which folds down about a hinge 112 to create a "ramp-like gate" 114 onto the tailgate. The frame support 88 provides a rear support means to elongated cargo which is supported forwardly either on the roof of the cab 14 or onto a forward support frame 116 fixedly attached to the wall 22 on the front end of the cargo bed of the pickup truck 14.

Thus, what has been shown is a unique bed frame apparatus which may be moved or pivoted from a first stowaway, rear window-shielding orientation immediately adjacent the rear wall of a cab of a pickup truck, into a bed extender orientation atop the folded down tailgate of that pickup truck. The bed extender apparatus of this invention also provides a further frame for supporting equipment and material in general alignment with the roof of the cab thus further increasing the load carrying capacity of the pickup truck while maintaining its minimum interference with any carrying capacity of the truck bed when such bed extender apparatus is not in use.

I claim:

1. A bed extender apparatus for extending and enlarging useful carrying capacity of a bed of a pickup truck, said pickup truck having a rear window and an elongated cargo bed therebehind, said elongated cargo bed defined by a forward wall, a pair of sidewalls, a floor and a tailgate hingedly attached to a rearward edge of said floor, said bed extender apparatus comprising:

a U-shaped frame movably arranged on an upper edge of said sidewalls, said U-shaped frame including a transverse wall and a pair of parallel arms, said transverse wall being storably disposed adjacent said forward wall of said bed when said bed extender apparatus is in a non-bed extended configuration, said transverse wall being displaceable onto said tailgate when said bed extender is in a bed extended configuration.

2. The bed extender apparatus as recited in claim 1, wherein said arms have a second end which are attached to said sidewalls of said pickup truck.

3. The bed extender apparatus as recited in claim 1, wherein said transverse wall of said bed extender apparatus is arranged to shieldably protect said rear window when said bed extender apparatus is in a forwardly-configured, stowed-away orientation.

4. The bed extender apparatus as recited in claim 2, wherein said second end of said arms are pivotably connected to said sidewalls by an articulable joint.

5. The bed extender apparatus as recited in claim 1, wherein said transverse wall includes a generally U-shaped support frame arranged opposed thereto to function as a rearward support for cargo to be carried in an overhead manner.

6. The bed extender apparatus as recited in claim 5, including a forwardly disposed support frame arranged above said forward wall of said cargo bed, to function as a forward support for cargo to be carried in as overhead manner.

7. The bed extender apparatus as recited in claim 1, including a side partition arranged at a first end of each of said arms and adjacent said transverse wall to provide an enclosure arrangement to any cargo carried in said bed of said pickup truck.

8. The bed extender apparatus as recited in claim 1, wherein said transverse wall includes a generally U-shaped support frame removably arranged in a first end of said arms, to be re-installed in said arms at an opposite side thereof when said bed extender apparatus is in the bed extending configuration above said tailgate.

9. The bed extender apparatus as recited in claim 1 wherein said transverse wall includes a hingedly openable flap arranged to function as a ramp from said tailgate of said pickup truck.

10. A method of extending a elongated cargo bed of a pickup truck, said cargo bed being comprised of a floor, a forward wall, a pair of sidewalls and a tailgate hingedly arranged at a rearward edge of said floor, said method comprising the steps of:

arranging a generally U-shaped frame having a pair of generally parallel side arms and a transverse wall, onto an upper edge of said forward wall of said cargo bed;

displacing said U-shaped frame 180 degrees from its position on said forward wall to a position wherein said transverse wall is disposed on said tailgate when said tailgate is in a lowered orientation, said U-shaped frame arranged to function as a secure cargo bed extender for a pickup truck.

11. The method as recited in claim 10, including the step of:

arranging a support frame adjacent said transverse wall, and displacing said frame support with respect to said forward wall of said cargo bed and said transverse wall, to provide an overhead support to elongated cargo when said U-shaped frame is displaced from a forwardmost storage position to a rearwardly extending cargo bed-extended orientation.

12. The method as recited in claim 11, including the step of:

removing said support frame from a pair of openings in said arms; and inserting said support frame into a second pair of openings in said arm when said transverse wall is arranged into a bed extended orientation on said tailgate.

13. The method as recited in claim 10, including the step of:

arranging a fold-down ramp in a location in said transverse wall of said cargo bed extender apparatus;

folding downwardly said ramp to permit loading of said cargo bed of said pickup truck.

14. A method of extending a elongated cargo bed of a pickup truck, said cargo bed being comprised of a floor, a forward wall, a pair of sidewalls and a tailgate hingedly arranged at a rearward edge of said floor, said method comprising the steps of:

arranging a transverse wall immediately adjacent said forward wall of said cargo bed;

displacing said transverse wall from its position adjacent said forward wall to a position wherein said transverse wall is disposed on said tailgate when said tailgate is in a lowered orientation, said transverse wall including securement arms therewith for attachment to said sidewalls of said cargo bed, said arms and wall arranged to function as a secure cargo bed extender for the pickup truck.

15. The method as recited in claim 14, including the step of:

arranging a door-like portion on said transverse wall hingedly attached to said transverse wall;

folding said door-like portion downwardly so as to function as a ramp to said cargo bed.

16. The method as recited in claim 14, including the step of:

arranging a support frame onto said transverse wall to function as a support for overhead cargo when said transverse wall is displaced from its forwardmost position to its bed extending orientation.

17. The method as recited in claim 16, including the step of:

moving said support frame into an opposed relationship with respect to said transverse wall to permit said overhead cargo support function to occur.

18. The method as recited in claim 17, including the step of:

pivoting said support frame about a pair of hinges to effect said opposed relationship with said transverse wall.

19. The method as recited in claim 14 wherein said transverse wall and said securement arms define a generally U-shaped pickup truck bed extender apparatus for articulation on pickup truck cargo beds from a stowed-away forwardmost orientation to a bed extended orientation 180 degrees therefrom.

* * * * *